Sept. 15, 1964   L. M. HAGEN ETAL   3,149,216
APPARATUS FOR THE PREPARATION OF HIGH PURITY SILICON
Original Filed Aug. 17, 1959   2 Sheets-Sheet 1

INVENTORS:
L. M. HAGEN
W. F. LEVERTON
BY
ATTORNEY

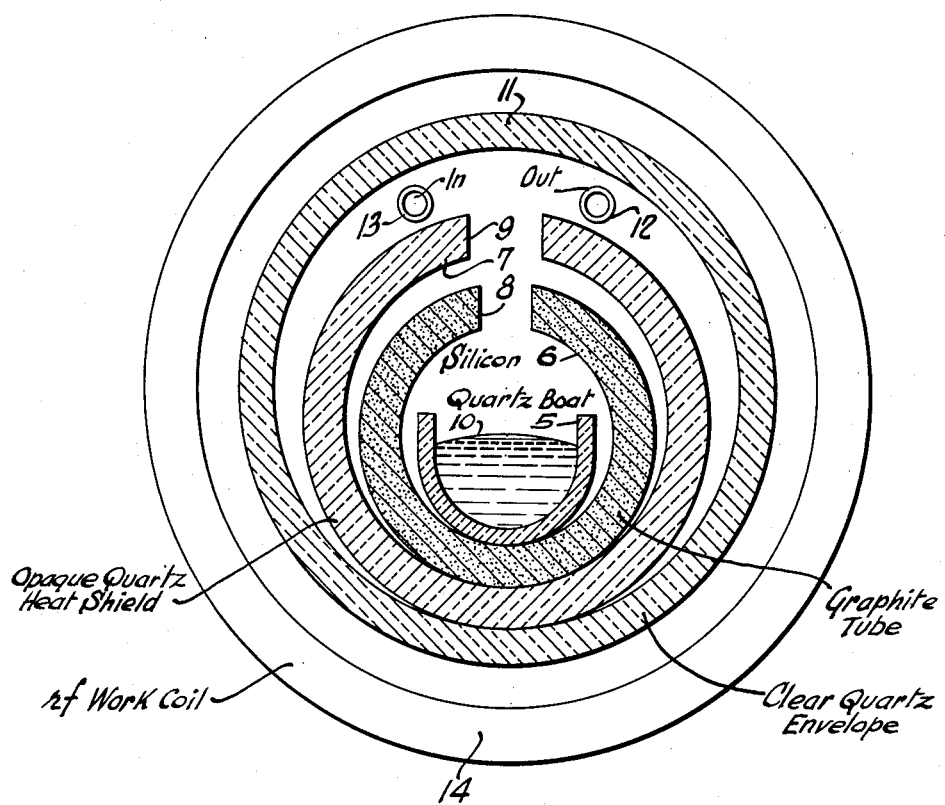

United States Patent Office 3,149,216
Patented Sept. 15, 1964

3,149,216
APPARATUS FOR THE PREPARATION OF
HIGH PURITY SILICON
Lawrence M. Hagen, Nashua, N.H., and Walter F. Leverton, Weston, Mass., assignors, by mesne assignments, to the United States of America as represented by the Secretary of the Navy
Original application Aug. 17, 1959, Ser. No. 834,361, now Patent No. 3,101,257, dated Aug. 20, 1963. Divided and this application Aug. 9, 1962, Ser. No. 230,031
1 Claim. (Cl. 219—10.43)

This invention relates to the preparation of a high purity crystalline silicon of semiconductor grade and particularly to an improved method and apparatus for obtaining such high purity silicon employing the thermal decomposition of high purity silicon nitride. This application is a division of application Serial Number 834,361 filed August 17, 1959.

An object of this invention is to provide an improved and relatively simple, practical, effective and inexpensive apparatus for producing such silicon of semiconductor grade.

Other objects and advantages will be apparent from the following description of an example of the invention and the novel features will be particularly pointed out hereinafter in connection with the appended claims.

In the accompanying drawings:

FIG. 3 is a schematic diagram illustrating in cross-section apparatus that may be employed for the multiple zone refining of the silicon in accordance with this invention.

Figure 2:
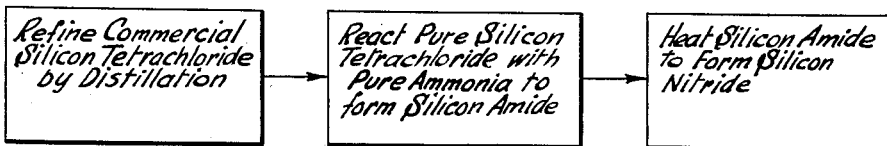
FIG. 2 is a schematic diagram illustrating a sequence of steps employed in accordance with this invention.
Figure 2:
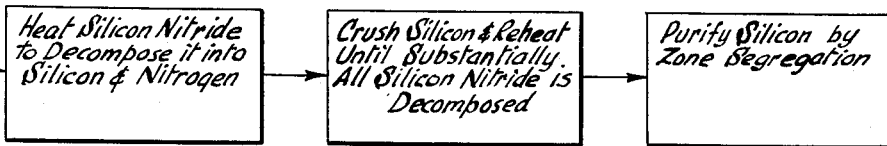

Referring first to FIG. 2, this invention comprises, as the first step of the method, the refining of commerical silicon tetrachloride by distillation. This purified product so obtained, is then reacted with pure ammonia to produce a compound of silicon, nitrogen, and hydrogen, i.e., silicon amide, which represents the second step in the method. Silicon amide so obtained, is then heated to form silicon nitride, which is the third step in the method. The silicon nitride so obtained is then heated to cause thermal decomposition of the silicon nitride into silicon and nitrogen, and since the nitrogen is a gas and escapes, it leaves only silicon. Usually all of the silicon nitride is not decomposed in this manner, and therefore the silicon product obtained by the thermal decomposition of the amide is crushed and reheated for further decomposition, with the crushing and reheating continued until substantially all of the silicon nitride has been decomposed in this manner. The resulting silicon so obtained, is then purified by zone segregation.

Using relatively impure commercial nitride it has been found that the decomposition rate is rapid at temperatures that are easily obtained using R.F. induction heating. For example, several grams of commercial silicon nitride can be decomposed in about 5 minutes at a temperature of approximately 1600° C.

The conversion of silicon nitride to silicon metal may be obtained, for example, by thermo decomposition in the following manner:

Silicon nitride powder is placed in a quartz crucible with a spherical graphite target such as about ½" in diameter buried in the center of the nitride 1/16" below the surface. This graphite target is then heated by induction to temperatures varying from about 1600° C. to 1700° C., which reduces the silicon nitride to a mixture which is about 50% silicon nitride and 50% silicon. This mixture of silicon and silicon nitride is then crushed and then reheated repeatedly for several times until substantially all the silicon nitride has been decomposed into silicon metal and nitrogen.

Figure 1:
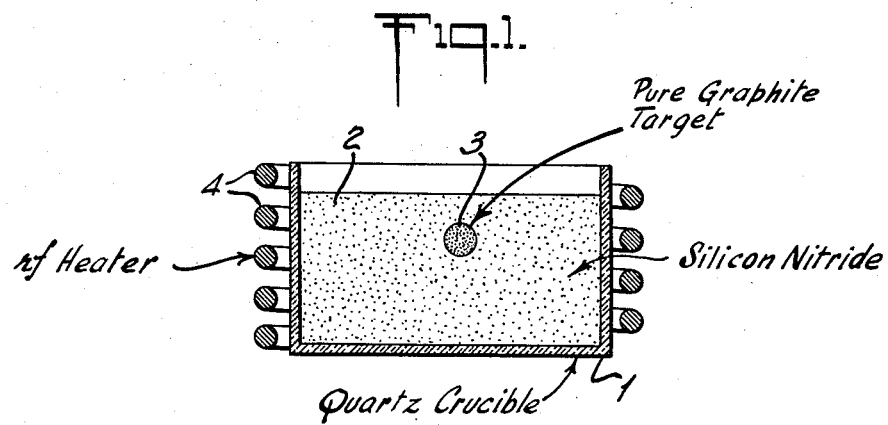
FIG. 1 is a schematic sectional elevational view of a crucible inductively heated and containing sulphur nitride which is thermally decomposed in accordance with this invention.

This heating of the silicon nitride in the quartz crystal with the graphite target buried therein is illustrated in FIG. 1, in which the quartz crucible 1 contains a quantity 2 of silicon nitride, and buried in this silicon nitride powder is the pure graphite target 3. The induction heating coil 4 encircles the crucible and the energy created by the induction coil 4 is taken up by the graphite target and converted into heat which heats the surrounding powder and decomposes it into silicon metal and nitrogen.

In order to employ the crystalline metal so obtained as a semi-conductor, it is advantageous to purify it and this purification is preferably obtained by what is known as multi-zone purification or refining, and apparatus suitable for that purpose is illustrated schematically in FIG. 3. The doping impurities, with the possible exception of boron, could, in principle, be removed rather efficiently from silicon by a multiple-zone segregation which has been used commercially for refining germanium. Early attempts to zone refine silicon failed because molten silicon wet the crucible which was usually formed of quartz and caused it to crack during the cooling cycle between molten zones.

According to the present invention, the cracking of the crucible has been greatly reduced or eliminated by maintaining the regions between the molten zones at relatively high temperatures, and apparatus such as illustrated in FIG. 3 schematically, is useful for this purpose. The crucible 5, FIG. 3, is fabricated from clear quartz and has a wall thickness from about 1 to 2 mm., and can, for example, be about 45 cm. long, and of semicircular cross section approximately 2 cm. in diameter. This crucible 5 is elongated and placed in a horizontal position with its open face uppermost. It is then placed within and is supported by a high-purity graphite tube 6, which is open at both ends, and is about 55 cm. long, 3.5 cm. outside diameter, and about 5 mm. wall thickness. This graphite tube, which serves as an R.F. heater, is surrounded by a heat shield 7 formed of opaque quartz tube of about 60 cm. long, 5 cm. outside diameter, and about 5 mm. wall thickness. The graphite heater 6 and the heat shield 7 are both provided with slots 8 and 9, respectively, along the top for substantially their entire length so as to permit visibility of the silicon in the ingot 10 in the crucible. This assembly is placed in a clear quartz tube or envelope 11 which forms the complete enclosure for the heat shield, graphite tube, quartz crucible and the ingot of silicon, and it has an inlet 12 and an outlet 13 in an end wall thereof, so that an inert gas such as pure argon or helium may be circulated through the envelope to flush out the air and replace it with the inert gas. This flushing may be continuous or it may be discontinued after all the air has been removed from the envelope or enclosure.

An R.F. work coil 14 having a plurality of heating portions spaced apart along the length of the envelope provides an equal number of heating zones that by induction heat the graphite tube and through it the crucible and zones of the silicon ingot. This work coil is movable over the envelope and as it does so, there are three induction heating zones which move along the envelope and create three spaced apart molten zones in the silicon ingot, and between these molten zones, the ingot is maintained at a temperature greater than about 700° C. As the leading coil leaves the end of the ingot, the entire work coil is moved back exactly the distance between successive zones, and the process is repeated.

This broad principle of zone purification or segregation, as used for germanium, is old and is disclosed in United States Patent No. 2,739,088. The apparatus disclosed in FIG. 3 and described herein for creating these moving molten zones is new, particularly as applied to silicon, and has greatly reduced the damage due to the cracking of the crucible as the crucible cools between the molten zones of the ingot. It is found that the crucible under this manner of use does not break during the usual run, but at the conclusion of the process of refinement, the crucible and ingot may crack during the cooling, but the quartz crucible attached to the ingot may be removed by soaking in hydrofluoric acid. After typical runs with such apparatus is was found that the resulting material was of the p-type, and the variation of resistivity along the length of the pulled crystals indicated that the principle doping impurity was boron. Such apparatus is trouble free in operation, and the progress of the spaced molten zones is visible through the envelope and through the slots 8 and 9, which are aligned with one another above the crucible. It provides a very practical method and means for the removal of doping materials other than boron from silicon. Important features of this apparatus and method are the provision for maintenance of high temperatures throughout the ingot and crucible during the entire run, and the opaque quartz heat shield which permits operation at a reasonable power level.

It will be understood that various changes in the details, materials, steps, and arrangements of parts, which have been herein described and illustrated, in order to explain the nature of the invention, may be made by those skilled in the art within the principle and scope of the invention as expressed in the appended claim.

We claim:

Apparatus for zone refining of silicon which comprises an elongated upwardly opening quartz boat in which a silicon ingot to be refined may be disposed, an elongated graphite tube in which said boat is disposed and having a slot in its upper surface extending lengthwise for approximately its full length, an elongated opaque quartz tube in which said graphite tube is disposed and also having a slot in its top side which extends lengthwise for approximately its full length and which is approximately aligned with the slot in the graphite tube, an elongated, clear quartz envelope enclosing said tubes, forming a closed casing in which said tubes are confined and having valve controlled inlet and outlet passages by which an inert gas may be circulated through the casing to flush out air in said tubes and replace it with such inert gas, and induction heating means encircling and movable along said envelope to heat a zone of said silicon ingot in said boat and shift that zone progressively along the boat and thereby move a molten silicon zone along the silicon ingot in said boat while observing the moving zone through said clear envelope and the aligned slots in said tubes while said apparatus remains stationary.

References Cited in the file of this patent
UNITED STATES PATENTS

| | | |
|---|---|---|
| 2,826,666 | Cater | Mar. 11, 1958 |
| 2,893,847 | Schweickert et al. | July 7, 1959 |